United States Patent [19]

Fitt et al.

[11] Patent Number: 5,075,360

[45] Date of Patent: Dec. 24, 1991

[54] HIGH-SPEED STARCH-BASED CORRUGATING ADHESIVE CONTAINING A CARRIER PHASE COMPRISED OF STARCH, MODIFIED STARCH OR DEXTRIN AND POLYVINYL ALCOHOL

[75] Inventors: Larry E. Fitt, Orland Park; James J. Pienkowski, Oak Forest; Jack R. Wallace, Bolingbrook, all of Ill.

[73] Assignee: CPC International Inc., Englewood Cliffs, N.J.

[21] Appl. No.: 563,379

[22] Filed: Aug. 6, 1990

[51] Int. Cl.$^5$ .................... C09D 101/00; C09J 101/00
[52] U.S. Cl. ........................................ 524/48; 524/52; 524/50; 524/405; 106/213
[58] Field of Search .................. 106/210, 213; 524/48, 524/50, 52, 405

[56] References Cited

U.S. PATENT DOCUMENTS

| | | | |
|---|---|---|---|
| 3,355,307 | 11/1967 | Schoenberger et al. | 106/213 |
| 4,094,718 | 6/1978 | Czerwin | 156/210 |
| 4,400,480 | 11/1967 | Silano et al. | 106/213 |
| 4,600,739 | 7/1986 | Krankkala | 524/48 |
| 4,673,698 | 6/1987 | Krankkala | 524/48 |
| 4,677,145 | 6/1987 | Krankkala et al. | 524/48 |
| 4,826,719 | 5/1989 | Krankkala et al. | 428/182 |
| 4,933,383 | 6/1990 | Krankkala et al. | 524/52 |

FOREIGN PATENT DOCUMENTS 4519600  4/1966  Japan.

*Primary Examiner*—Theodore Morris
*Assistant Examiner*—Mary C. DiNunzio
*Attorney, Agent, or Firm*—Brooks Haidt Haffner & Delahunty

[57] ABSTRACT

A high speed corrugating adhesive having a carrier phase comprised of starch, modified starch or dextrin and polyvinyl alcohol in an aqueous emulsion wherein a cold water soluble, partially hydrolyzed, polyvinyl alcohol is used as a starting material. The polyvinyl alcohol is further hydrolyzed in situ to a degree of hydrolysis of more than about 95% by heating it in the presence of water, caustic, and starch, modified starch or dextrin. The carrier phase is admixed with a boron containing compound and a suspension of water and starch to prepare the corrugating adhesive for use in a corrugating machine.

10 Claims, No Drawings

HIGH-SPEED STARCH-BASED CORRUGATING ADHESIVE CONTAINING A CARRIER PHASE COMPRISED OF STARCH, MODIFIED STARCH OR DEXTRIN AND POLYVINYL ALCOHOL

BACKGROUND OF THE INVENTION

1. Field of the Invention

The present invention relates to carrier-type, starch-based corrugating adhesives which contain polyvinyl alcohol. More particularly, the invention relates to a high-speed corrugating adhesive which has a carrier phase comprised of starch, modified starch or dextrin and a cold water soluble, partially hydrolyzed, polyvinyl alcohol. The polyvinyl alcohol is further hydrolyzed in situ by heating in the presence of water, caustic, and the starch, modified starch or dextrin.

2. Description of Related Art

Adhesives used in manufacturing corrugated board are usually comprised of starch, a boron containing compound, caustic, and, optionally, a waterproofing resin (where water resistance is needed) in a water base. The main binder of corrugating paper is the starch which is gelatinized in the corrugating process as it penetrates the paper fiber. The other components, namely, the boron containing compound, caustic, and waterproofing resin are auxiliary agents which modify the basic properties of the starch. Caustic, usually in the form of sodium hydroxide, directly affects the gelatinization point temperature of starch. Gelatinization point temperature is often referred to as gel point or gel temperature and is reduced from its natural value of 165° F. for unmodified corn starch to a temperature in the range from about 138° F. to about 152° F. by the addition of caustic. Caustic also enhances penetration of the gelatinized starch into the surface paper fibers allowing for better bonding.

Boron containing compounds perform multiple tasks. The most important function is developing the adhesive tackiness that is crucial in the formation of the "green bond". The green bond is the bond which holds the components of the corrugated board together until final heat curing of the adhesive system. It relies solely on the viscosity of the adhesive to maintain the integrity of the product during curing. Corrugating machine speeds therefore are limited by the rate of viscosity increase (i.e. rate of green bond formation) in the bond line between the liner and the corrugated medium. The oxygen atoms attached to the boron form stronger bonds, sometimes called boron bridges, between the starch and cellulose hydroxyl groups. Boron containing compounds also act as buffering agents in the presence of caustic and help maintain the viscosity stability of the adhesive paste.

It is known that polyhydroxy compounds other than starch, such as polyvinyl alcohol, will respond with the boron containing compounds in a manner similar to that with starch. Boron containing compounds and polyvinyl alcohol are believed to interact synergistically to form strong bonds. Like other polyhydroxy compounds, polyvinyl alcohol in the presence of starch will develop adhesive tackiness faster in the presence of boron, which means that the corrugator can operate at higher machine speeds.

Water proof or water resistant resins are considered to be an optional component of adhesives, and although some corrugating plants may not need them, most plants are prepared to use them when needed. Many types of thermosetting resins are suitable. The most common of them are derived from urea-formaldehyde, ketone-formaldehyde or melamine-formaldehyde. When heat and pressure is applied to them in a corrugating machine, they will condense to form an excellent water resistant network. When polyvinyl alcohol is added to adhesives containing these resins, it participates in cross-linking which will improve the water resistant bonds.

In the corrugating process, adhesive is commonly applied to the tips of the flutes of a corrugated medium. Then a non-corrugated flat paper liner is applied against the adhesive coated flutes as they pass between a corrugating roll and a pressure roll. The resulting product has the corrugating medium on one side and a flat liner on the other side and is called a sinqle-faced portion. The single-faced portion may be used "as is", or adhesive may be applied to the flute tips of the single-faced portion and a second flat sheet can be applied in the same manner as the first in what is called a "double-facer" or "double-backer" operation. The second liner sheet is treated with heat and reduced pressure (relative to the pressure used to make a single-faced portion) immediately following contact with the adhesive.

Starch-based adhesives called carrier-type adhesives are commonly used in processes for manufacturing corrugated paper board. In carrier-type adhesives, a portion of the starch (or dextrin) forms a carrier, often known as the gelatinized phase, which suspends the balance of the starch which is in an ungelatinized state. Under conditions of heat and pressure, the ungelatinized starch is rapidly hydrated and gelatinized to quickly increase the viscosity and adhesivity of the adhesive composition.

Polyvinyl alcohol has been added to starch based corrugating adhesives for many years to increase the viscosity and the strength of the bond between the corrugating medium and the liner material. In Japanese Patent Publication Number 45-19600 to Imoto et al. (July 4, 1970), for example, a suspension of powdered polyvinyl alcohol and ungelatinized starch in an alkaline aqueous solution of gelatinized starch and borax is described for use in producing highly water-resistant corrugated board. Imoto, et al. discloses the use of totally saponified (i.e. fully hydrolyzed) polyvinyl alcohol and water-soluble derivates thereof.

In U.S. Pat. No. 4,094,718 to Czerwin, a fully hydrolyzed polyvinyl alcohol having a fine particle size and low cold water solubles is used in a modified starch-based corrugating adhesive containing borax, alkali and water. The polyvinyl alcohol is in suspension in an aqueous emulsion of the adhesive and is dissolved during the corrugating process when the paper passes between the heated rolls of a corrugating machine.

U.S. Pat. Nos. 4,600,739 and 4,677,145 to Krankkala disclose corrugating adhesives comprised of an aqueous suspension of unmodified starch, caustic, a boric acid compound and a water soluble, partially hydrolyzed, polyvinyl alcohol. Based on the specifications of both patents, these adhesive compositions allow corrugators to attain high line speeds with improved green bond strength. According to U.S. Pat. No. 4,826,719 to Murdock et al., however, it was found that the amounts of soluble polyvinyl alcohol that could be used under the two prior Krankkala patents was limited by the fact that at higher concentrations than claimed, the soluble polyvinyl alcohol tended to form gels as was recognized in Czerwin and Imoto et al.

The Murdock et al. patent discloses a corrugating adhesive based on unmodified starch and containing an alkaline metal hydroxide, a boric acid compound and a cold water insoluble, fully hydrolyzed, polyvinyl alcohol which is heat solubilized in the adhesive composition before application. According to the patent specification, this adhesive composition also allows corrugators to attain high line speeds.

It has now been discovered in accordance with the present invention that very high line speeds can be attained in conventional corrugating machines with a carrier-type corrugating adhesive wherein the carrier phase is prepared by further hydrolyzing a cold water soluble, partially hydrolyzed, polyvinyl alcohol in situ in the presence of water, caustic, and starch, modified starch or dextrin. As a further advantage, gelation problems associated with the use of fully hydrolyzed polyvinyl alcohol starting materials are avoided. It has also been found that the adhesive composition of the invention can be used to make a superior water resistant corrugated board and it is particularly useful for making multi-walled corrugated board a high speeds.

SUMMARY OF THE INVENTION

The corrugating adhesive composition of the invention is made by preparing a carrier phase comprised of an aqueous emulsion of starch, modified starch or dextrin and a cold water soluble, partially hydrolyzed, polyvinyl alcohol which has been further hydrolyzed in situ to a degree of hydrolysis of more than about 95%. The in situ reaction is effected by adding caustic, such as alkali metal hydroxide, to an aqueous solution of starch, modified starch or dextrin and polyvinyl alcohol, to provide an alkaline pH, and heating to cause further hydrolysis of the polyvinyl alcohol. In a preferred embodiment, a low molecular weight polyvinyl alcohol is used with modified starch.

The carrier phase is added to a suspended starch phase to make the adhesive composition. The composition also contains a boron containing compound which can be added either in the carrier phase, the suspended starch phase, or both phases. Waterproof or water resistant resins can also be added to the composition as an option.

DETAILED DESCRIPTION OF THE INVENTION

In the following description, the examples, and the claims, all parts and percentages are by weight.

The corrugating adhesive product of the present invention is made by separately preparing two intermediates and then combining them. One intermediate is called the carrier phase and the other is called the suspended starch phase.

The carrier phase is made by admixing the polyvinyl alcohol and starch, modified starch or dextrin with water. These components can be added to the water together or in any order. The amount of polyvinyl alcohol which is added is from about 0.1 to about 10 parts per 100 parts of the carrier phase or from about 0.04 to about 3 parts per 100 parts of the adhesive composition. Starch, modified starch or dextrin is added in an amount from about 5 to about 30 parts per 100 parts of the carrier phase or from about 2 to about 10 parts per 100 parts of the adhesive composition.

The foregoing components are continuously mixed and heated to a temperature from about 125° F. to about 165° F. Sufficient caustic is then added to provide an alkaline pH while continuing mixing and maintaining heating for a sufficient time and at a sufficient temperature to hydrolyze the polyvinyl alcohol to a degree of hydrolysis of more than about 95%. The pH preferably will exceed about 10. The sufficient time and temperature will generally be from about 10 to about 25 minutes at from about 125° F. to about 165° F. Lower temperatures generally correspond with longer times. The time of the reaction will also be affected by the relative concentrations of polyvinyl alcohol and caustic.

Following the removal of heat, mixing is continued to allow uniform cooling. Water can be added at this stage to speed cooling.

The suspended starch phase is made by admixing starch with heated water. The water is heated at a temperature from about 70° F. to about 95° F. and is mixed continuously. The starch is added in an amount from about 10 to about 30 parts of starch per 100 parts of the corrugating adhesive, and preferably in an amount from about 12 to about 25 parts starch per 100 parts of the corrugating adhesive.

A boron containing compound such as boric acid or a boric acid salt must be added at some stage in the process to improve tack or stickiness. It may be added in the preparation of the carrier phase, the suspended starch phase, or in both phases. When a portion of the boron containing compound is added during the preparation of the carrier phase, it also improves the viscosity stability of the final adhesive product. Preferably, however, most of the boron containing compound is added to the suspended starch phase.

When the boron containing compound is added during the preparation of the carrier phase, it is added in an amount from about 0.03 to about 1 part per 100 parts of the carrier phase or in an amount from about 0.01 to about 0.3 parts per 100 parts of the corrugating adhesive. The boron containing compound added to the suspended starch phase is added in an amount from about 0.3 to about 1 part per 100 parts of the corrugating adhesive.

The carrier phase is gradually added to the suspended starch phase with continuous mixing of the suspended starch phase. The temperature of the suspended starch phase is maintained at from about 90° F. to about 105° F. during such gradual addition. The amount of the carrier phase added is from about 15 to about 50 parts per 100 parts of the adhesive.

A waterproofing or water resistant resin may be added to the suspended starch phase at any time in amount from about 0.5 to about 5 parts per 100 parts of the adhesive. It is preferable to add the resin following completion of all of the other adhesive preparation steps.

The individual components of the composition of the invention are described in detail below along with descriptions of their preferred embodiments.

Polyvinyl Alcohol

Polyvinyl alcohol is a polyhydroxy secondary alcohol derived from a series of vinyl alcohol monomer units which by themselves do not exist. The structure for polyvinyl alcohol is shown below, with no intent to show tacticity of any kind.

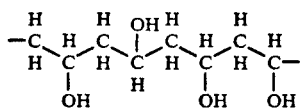

The polymer is manufactured first as polyvinyl acetate. Its molecular weight can be controlled by varying the polymerization conditions. The average molecular weight generally ranges from about 9,000 to 186,000 molecular weight units, but can be lower or higher. Depending on the polymer properties which are desired for a particular application, the acetate is then hydrolyzed, but not necessarily to completion. The degree of hydrolysis can theoretically range from 0 to 100%, but commercially available products generally range from 78 to 100% (which means there can be anywhere from 0 to 22% residual acetate functionality present in the polyvinyl alcohol in commercially available products). Tackified grades of polyvinyl alcohol derived from fully hydrolyzed polyvinyl alcohol which are already borated are also available commercially. It has been determined that these products provide improved water resistance, but many of them are highly viscous, not easily dispersible, and can cause gelation problems in corrugating applications.

The chemistry and properties of polyvinyl alcohol are discussed in detail in the Encyclopedia of Polymer Science and Technology, Volume 14, Chapter V (John Wiley & Sons, Inc., 1971). In particular, solubilities are discussed on pages 162 and 163 where it is indicated that partially hydrolyzed polyvinyl alcohols are cold water soluble and more fully hydrolyzed polyvinyl alcohols are not. Cold water solubility is generally measured in the industry at an ambient temperature of 22° C. using a stirrer.

The polyvinyl alcohol which is used in accordance with the present invention is cold water soluble, has a molecular weight of less than about 30,000, preferably less than about 15,000, and most preferably less than about 11,000 molecular weight units, and has a degree of hydrolysis of less than about 92%, preferably less than about 88%. Suitable commercially available polyvinyl alcohols include AIRVOL ® 603, AIRVOL ® 203, GELVATOL ® 40-10 and GELVATOL ® 40-20 available from Air Products and Chemicals, Inc., Polymer Chemicals Division, Allentown, Pa. 18795 U.S.A. The viscosity of the polyvinyl alcohols used in accordance with the present invention range from about 2 centipose to about 20 centipose, preferably from about 2 centipoise to about 4 centipoise, at a temperature of 68° F. (20° C.) in a 4% aqueous solution.

Carrier Phase Starch or Dextrin

While unmodified starch or dextrin can be used to make the carrier phase of the present invention, modified starch is preferred because it enables the dissolution of substantially more solids (up to twice the amount attainable with unmodified starch) in the adhesive composition and therefore contributes to the development of better green bonding and adhesive characteristics. The reason is that modified starches, when pasted in water, are less viscous than their unmodified counterparts, and as a consequence they can "carry" more ungelatinized starch at practical viscosities.

The modified starch which is used in accordance with the present invention can be mechanically, chemically or heat modified. Compared to unmodified starches, modified starches frequently possess superior physical properties such as increased solubility, better film forming, increased whiteness, improved gel strength, viscosity stability, increased adhesivity, improved resistance to shear, and increased resistance to freeze-thaw degradation. Suitable chemically modified starches include modified oxidized starch such as hypochlorite-oxidized starch, acid-thinned starch, ethylated starch, cross-bonded starch and others which have reduced molecular weight, higher fluidity and/or functional subgroups. Examples of chemically modified starches which can be used in the invention and are commercially available are SUREBOND ® or STABLEBOND ® modified starches which have residual carboxyl functionality and extreme uniformity and are sold by the Corn Products Unit of CPC International Inc., P.0. Box 8000, Englewood Cliffs, N.J. 07632 U.S.A.

Unmodified starches which can be used in the carrier phase are the same as those described in more detail below in the discussion of the suspension phase starch.

The dextrins which can be used in the carrier phase are prepared by heating starch under various conditions as more fully described in Whistler, R.L. et al., Starch: Chemistry and Technology, 2nd. Edition, Chapter XX, pages 596-607, Academic Press, Inc. (New York, 1984).

Suspension Phase Starch

The unmodified starch used in the suspension phase is a commodity chemical produced from the root, stem or fruit from a number of plants. It is a high molecular weight carbohydrate polymer which is comprised of linear and branched polysaccharide polymers. Modified starch can be used as the suspension phase starch, but unmodified starch is more economical. When the term "starch" is used herein with reference to the suspension phase starch, it is intended to include both unmodified and modified starch, unless otherwise indicated.

Boron Containing Compound

Any boron containing compound having free hydroxyl groups attached to the boron atoms can be used. The most commonly used compounds are commercial boric acid (orthoboric acid, $H_3BO_3$ and its hydrated forms, $H_3BO_3.xH_2O$) and borax (sodium tetraborate decahydrate, $Na_2B_4O_7.10H_2O$ and other hydrate and anhydrous forms).

Caustic

Any strong base can be used, but the preferred bases are alkali metal hydroxides. The most preferred are sodium and potassium hydroxide.

Waterproofing or Water Resistant Resin

Preferred waterproofing or water resistant resins include those which upon heating in basic media generate cross-linking species which react and cross-link with any available hydroxyl group in the starch or polyvinyl alcohol molecules. The cross-linking reaction reduces the hydrophilic nature and water-solubility of the starch and polyvinyl alcohol molecules by effectively removing the availability of hydroxyl groups to water and by developing hydrophobic, aliphatic alkylene-type cross-linking moieties. Condensation products from the reaction of a ketone and an aldehyde compound are suitable. These resins are characterized as polyether polymers, but can contain a variety of other monomers such as urea, melamine, and the like. The most preferred resins are acetone-formaldehyde resins, acetone-urea-formaldehyde reins, and acetone-melamine-formaldehyde resins comprising about 1.5–30% by weight acetone, about 5–50% by weight formaldehyde and about 0–15% of a third monomer. A commercially available cross-linking resin which is suitable for use in the present invention is the ASTROMEL ® series of resins manufactured by Astro Industries, Inc., 114 Industrial Boulevard, P.O. Box 2559, Morganton, N.C. 28655 U.S.A.

EXAMPLES

Several corrugated board samples were made using a conventional corrugating machine. The starch preparation station was a standard Stein-Hall system manufactured by The Ringwood Co., 1150 W. 40th Street., Chicago, Ill. 60609 U.S.A. consisting of a 250-gallon secondary mixer. The water and caustic were metered volumetrically and the unmodified starch was added through a bulk addition system using load cells. The borax and resin were measured and added manually. The carrier starch (STABLEBOND and SUREBOND) which is packaged in 50-pound bags, was added in 50-pound increments.

The board samples were a mix of single and double wall as well as a mix of various weight papers.

Components common to both the STABLEBOND and SUREBOND tests were polyvinyl alcohol (PVOH), 50% sodium hydroxide (NaOH), 5 mol borax ($Na_2B_4O_7.5H_2O$), and the water resistant resin ASTROMEL NW 6V. ASTROMEL NW 6V is a methylated melamine-formaldehyde resin having 72–74% dry solids.

STABLEBOND G-551 with AIRVOL-603

A series of samples were made using STABLEBOND G-551 modified starch with AIRVOL 603 polyvinyl alcohol. STABLEBOND G-551 is a chemically modified, oxidized, corn starch and AIRVOL 603 has a degree of hydrolysis from about 78–82%, an approximate number average molecular weight from 9,000 to 10,000 and a viscosity from about 2.7 to about 3.5 centipoise in a 4% aqueous solution at 68° F. (20° C.).

Adhesive development and preparation focused on the double backer side because that is the limiting factor for both board quality and machine speed. Initially a general formula for making an adhesive with STABLEBOND G-551 was used, but additional caustic was necessary because of the polyvinyl alcohol addition. There was an indication that the polyvinyl alcohol was consuming some of the caustic because the gel points of the finished pastes were creeping higher when the polyvinyl alcohol was increased. Caustic will lower the gel point. A rising gel point, therefore, indicates that caustic is being consumed.

Paste viscosities were high in the beginning, but when starch quantities (both modified carrier starch and unmodified suspension phase starch) were adjusted, the viscosities were established at their proper levels.

The polyvinyl alcohol did not dissolve completely in the primary mixer, because one could see small white particulate matter, but it did disperse quite readily with some foaming. The polyvinyl alcohol was added as a percentage of the total starch used in the formula. For example, 2% PVOH means 31 pounds of polyvinyl alcohol mixed with 1550 pounds of total starch (250 lbs. STABLEBOND and 1300 lbs. of pearl starch). The quantities of STABLEBOND and polyvinyl alcohol (abbreviated as "PVOH" in the tables) used in the experiments are set forth in Table 1.

TABLE 1

Formulas for STABLEBOND G-551 and Polyvinyl Alcohol Double Backer Adhesives

| | % PVOH | | | | |
|---|---|---|---|---|---|
| | 0 | 2 | 3 | 5 | 7* |
| Primary Mixer | | | | | |
| Water, gal. | 100 | 100 | 100 | 100 | 100 |
| PVOH, lbs. | 0.0 | 31 | 46.5 | 75 | 105 |
| Mix, min. | 0 | 5 | 5 | 5 | 5 |
| STABLEBOND, lbs. | 300 | 250 | 250 | 200 | 200 |
| Heat, °F. | 150 | 150 | 150 | 150 | 150 |
| Caustic, lbs. | 47.2 | 47.2 | 47.2 | 47.2 | 47.2 |
| Mix, min. | 20 | 20 | 20 | 20 | 20 |
| Cooling Water, gal. | 90 | 90 | 90 | 90 | 90 |
| Mix, min. | 5 | 5 | 5 | 5 | 5 |
| Secondary Mixer | | | | | |
| Water, gal. | 390 | 400 | 400 | 400 | 400 |
| Heat, °F. | 90 | 90 | 90 | 90 | 90 |
| 5 mol Borax, lbs. | 27 | 27 | 27 | 27 | 27 |
| Pearl Starch, lbs. | 1400 | 1300 | 1300 | 1300 | 1300 |
| ASTROMEL Resin, lbs. | 100 | 100 | 100 | 100 | 100 |
| Final Mix | | | | | |

Drop contents of Primary Mixer into Secondary Mixer over a period of 20 to 30 minutes.
Mix for 10 minutes.
Measure viscosity and gel temperature before pumping to storage.

| Viscosity, sec. (Stein-Hall) | 45 | 36 | 49 | 30 | — |
| Gel Temp., °F. | 142 | 148 | 148 | 150 | — |
| Solids | 27.3 | 25.7 | 25.9 | 26.2 | 26.2 |

*A 7% PVOH adhesive was made, but it was rejected because it was too viscous, and had the texture of a light gum.

Corrugated board samples representative of the trial period were taken and submitted to Container-Quinn Testing Laboratories, Inc., 170 Shepard Avenue, Wheeling, Ill. 60090 U.S.A. for pin adhesion and voluntary ply separation (water resistance) using Technical Association of the Pulp and Paper Industry, Inc. (TAPPI) One Dunwoody Park, Atlanta, Ga. 30341 U.S.A. methods T821 and T812 respectively. (Details of the methods are published in *TAPPI Test Methods* 1989 available from TAPPI.)

Container-Quinn ran an additional test called wet pin adhesion that is not part of TAPPI methodology, but often is useful. The difference between the dry and wet pin adhesion tests is that in the wet pin adhesion test the board samples are soaked in water for one hour before running the T821 pin adhesion test.

The voluntary ply separation procedure is a water resistance test whereby board samples are submersed vertically in a water bath for 24 hours at room temperature. The samples are removed from the water bath and examined for separation of liner and medium.

TABLE 2

Physical Testing of Double Backer Board Made With STABLEBOND G-551 and Polyvinyl Alcohol

| Sample ID | Ply Sepn T812 | Dry Pin Adhesion T821 lbs./4 in² (Failure Type) | Wet Pin Adhesion lbs. MSF (Failure Type) |
|---|---|---|---|
| Board 1 0% PVOH (Control) | Fail | 59 (100% Fiber Tear) | 3.1 (5% Fiber Tear) (95% Adhesive Bond) |
| Board 2 2% PVOH | Pass | 69 (80% Fiber Tear) (20% Adhesive Bond) | 4.2 (100% Adhesive Bond) |

TABLE 2-continued

Physical Testing of Double Backer Board Made With STABLEBOND G-551 and Polyvinyl Alcohol

| Sample ID | Ply Sepn T812 | Dry Pin Adhesion T821 lbs./4 in² (Failure Type) | Wet Pin Adhesion lbs. MSF (Failure Type) |
|---|---|---|---|
| Board 3 3% PVOH | Pass | 70 (95% Fiber Tear) (5% Adhesive Bond) | 5.7 (5% Fiber Tear) (95% Adhesive Bond) |
| Board 4 3% PVOH | Pass | 73 (75% Fiber Tear) (25% Adhesive Bond) | 3.9 (100% Adhesive Bond) |
| Board 5 5% PVOH | Fail | 70 (60% Fiber Tear) (40% Adhesive Bond) | 2.0 (100% Adhesive Bond) |

As shown above, there was an improvement in both dry and wet pin adhesion on the 2% to 3% polyvinyl alcohol samples, and they also passed the water resistant ply separation (abbreviated as "Ply Sepn" in the table) test. Although the 5% polyvinyl alcohol sample failed the wet pin adhesion and ply separation tests, it did show improvement in dry pin adhesion.

There was definite improvement in machine speed. For example, a 90-26-90-26-90 AC double wall board made with 3% polyvinyl alcohol adhesive ran at 320 feet per minute (fpm) where normally it would run at 200 fpm. The letters "A" and "C" refer to the flute size ("A" means a flute having a height of 0.185 inches (0.470 centimeters) and 33.5 flutes per foot (110 per meter) and "C" means a flute having a height of 0.42 inches (0.36 centimeters) and 39 flutes per foot (128 per meter) and the numbers refer to the weight of the paper (90 lb. paper means 1,000 square feet of the paper weighs 90 lbs.). The series of numbers define the board construction, so that a 90-26-90-26-90 board is double wall board with 90 lb. paper used for the liners and 26 lb. paper used for the medium (flutes). Other combinations with 3% polyvinyl alcohol such as AC double wall 69-26-69-26-69 ran at 325 fpm and 42-26-42-26-69 ran at 480 fpm. With 2% polyvinyl alcohol adhesive, the board combination 62-30-42-30-62 ran at 300 fpm while the 5% polyvinyl alcohol adhesive ran 42-26-42-26-69 board at the top speed of 480 fpm. The operators were able to run the corrugator faster when the polyvinyl alcohol was added. The limiting factor in most cases was mechanical and not adhesive performance.

SUREBOND G-550 with AIRVOL-603

Another series of samples were made using SUREBOND G-550 modified starch with AIRVOL-603 polyvinyl alcohol. SUREBOND G-550 is a chemically modified, oxidized, corn starch which is more oxidized than STABLEBOND G-551.

During this series, single viscosity adhesives were made which were used for both single facer and double backer sides. After adjusting the general formula for making an adhesive with SUREBOND G-550 by adding caustic to make up for that consumed as a result of the addition of polyvinyl alcohol, the following adhesives were prepared as identified in Table 3.

TABLE 3

Formulas for SUREBOND G-550 and Polyvinyl Alcohol Single Viscosity used to Make Double Backer and Single Facer Board

| | % PVOH | | | | |
|---|---|---|---|---|---|
| | 0.0 | 1.0 | 1.5 | 2.0 | 3.0 |
| Primary Mixer | | | | | |
| Water, gal. | 100 | 100 | 100 | 100 | 100 |
| PVOH, lbs. | 0 | 16 | 24 | 32 | 48 |
| Mix, min. | 5 | 5 | 5 | 5 | 5 |
| SUREBOND, lbs. | 300 | 300 | 300 | 300 | 300 |
| Heat, °F. | 150 | 150 | 150 | 150 | 150 |
| Caustic, lbs. | 52 | 52 | 52 | 52 | 52 |
| Mix, min. | 20 | 20 | 20 | 20 | 20 |
| Cooling Water, gal. | 90 | 90 | 90 | 90 | 90 |
| Mix, min. | 5 | 5 | 5 | 5 | 5 |
| Secondary Mixer | | | | | |
| Water, gal. | 390 | 400 | 400 | 400 | 400 |
| Heat, °F. | 90 | 90 | 90 | 90 | 90 |
| 5 mol Borax, lbs. | 38 | 35 | 31 | 31 | 31 |
| Pearl Starch, lbs. | 1300 | 1300 | 1300 | 1300 | 1300 |
| ASTROMEL Resin, lbs. | 100 | 100 | 100 | 100 | 100 |
| Final Mix | | | | | |
| Drop contents of Primary Mixer into Secondary Mixer over a period of 20 to 30 minutes. | | | | | |
| Mix for 10 minutes. | | | | | |
| Measure viscosity and gel temperature before pumping to storage. | | | | | |
| Viscosity, sec. (Stein-Hall) | 34 | 38 | 32 | 48 | 67 |
| Gel. Temp., °F. | 144 | 144 | 143 | 145 | 147 |
| % Solids | 26.3 | 26.1 | 26.1 | 26.2 | 26.4 |

Lower levels of polyvinyl alcohol were used in this series compared to the series using STABLEBOND G-551. This enabled us to keep the Stein-Hall viscosity in the 35-55 second range while maintaining a high solids level for maximum water resistance. It was also noted in the STABLEBOND G-551 work that there appeared to be no particular advantage in using higher concentrations of polyvinyl alcohol. The corrugating machine ran just as fast with 2% polyvinyl alcohol as it did with 5% polyvinyl alcohol; yet the high polyvinyl alcohol adhesives (5 to 7%) were quite different from the normal paste in that they were more "gummy" and slippery.

Again board samples were submitted to Container-Quinn for the same tests as performed for the STABLEBOND G-551 series. Results are given in Table 4.

TABLE 4

Physical Testing of Board Made with SUREBOND G-550 and Polyvinyl Alcohol

| Sample ID Corrugator Speed Board Composition | Ply Sepn T812 | Dry Pin Adhesion T821 lbs./4 in² (Failure Type) | Wet Pin Adhesion lbs./MSF (Failure Type) |
|---|---|---|---|
| SINGLE FACER SIDE | | | |
| Board 1 0% PVOH Control 200 fpm 42-30-42 | Pass | 62 (15% Fiber Tear) (85% Adhesive Bond) | 3.2 (15% Fiber Tear) (85% Adhesive Bond) |
| Board 2 1% PVOH 224 fpm 69-30-69-30-69 | Pass | 98 (70% Fiber Tear) (30% Adhesive Bond) | 5.5 (5% Fiber Tear) (95% Adhesive Bond) |
| Board 3 1.5% PVOH 139 fpm 90-30-42-30-90 | Pass | 70 (80% Fiber Tear) (20% Adhesive Bond) | 6.0 (5% Fiber Tear) (95% Adhesive Bond) |

TABLE 4-continued
Physical Testing of Board Made with SUREBOND G-550 and Polyvinyl Alcohol

| Sample ID Corrugator Speed Board Composition | Ply Sepn T812 | Dry Pin Adhesion T821 lbs./4 in² (Failure Type) | Wet Pin Adhesion lbs./MSF (Failure Type) |
|---|---|---|---|
| Board 4 2.0% PVOH No Heat 177 fpm 90-26-42-26-90 | Pass | 90 (95% Fiber Tear) (5% Adhesive Bond) | 4.8 (10% Fiber Tear) (90% Adhesive Bond) |
| Board 5 2.0% PVOH Heat DB Side 177 fpm 90-26-42-26-90 | Pass | 98 (100% Fiber Tear) | 4.7 (10% Fiber Tear) (90% Adhesive Bond) |
| Board 6 2.0% PVOH No Heat 285 fpm 69-30-90 | Pass | 78 (35% Fiber Tear) (65% Adhesive Bond) | 3.2 (5% Fiber Tear) (95% Adhesive Bond) |
| Board 7 2.0% PVOH Heat DB side 285 fpm 69-30-90 | Pass | 55 (90% Fiber Tear) (10% Adhesive Bond) | 2.0 (100% Adhesive Bond) |
| Board 8 3% PVOH 355 fpm 90-26-90 | Pass | 113 (90% Fiber Tear) (10% Adhesive Bond) | 5.0 (10% Fiber Tear) (90% Adhesive Bond) |
| Board 9 3% PVOH 407 fpm 90-26-90 | Pass | 113 (100% Fiber Tear) | 5.2 (100% Adhesive Bond) |
| Board 10 3% PVOH 450 fpm 90-26-90 | Pass | 109 (80% Fiber Tear) (20% Adhesive Bond) | 5.7 (5% Fiber Tear) (95% Adhesive Bond) |
| Board 11 3% PVOH 505 fpm 90-26-90 | Pass | 95 (60% Fiber Tear) (40% Adhesive Bond) | 3.6 (100% Adhesive Bond) |
| DOUBLE BACKER SIDE | | | |
| Board 1 0% PVOH (Control) 200 fpm 42-30-42 | Pass | 80 (35% Fiber Tear) (65% Adhesive Bond) | 5.5 (35% Fiber Tear) (65% Adhesive Bond) |
| Board 2 1% PVOH 224 fpm 69-30-69-30-69 | Pass | 108 (95% Fiber Tear) (5% Adhesive Bond) | 6.8 (50% Fiber Tear) (50% Adhesive Bond) |
| Board 3 1.5% PVOH 139 fpm 90-30-42-30-90 | Pass | 113 (90% Fiber Tear) (10% Adhesive Bond) | 5.6 (100% Adhesive Bond) |
| Board 4 2.0% PVOH No Heat 177 fpm 90-26-42-26-90 | Pass | 100 (85% Fiber Tear) (15% Adhesive Bond) | 5.1 (10% Fiber Tear) (90% Adhesive Bond) |
| Board 5 2.0% PVOH Heat DB Side 177 fpm 90-26-42-26-90 | Pass | 102 (65% Fiber Tear) (35% Adhesive Bond) | 4.2 (20% Fiber Tear) (80% Adhesive Bond) |
| Board 6 2.0% PVOH No Heat 285 fpm 69-30-90 | Pass | 83 (50% Fiber Tear) (50% Adhesive Bond) | 3.0 (5% Fiber Tear) (95% Adhesive Bond) |
| Board 7 2.0% PVOH Heat DB side 285 fpm 69-30-90 | Pass | 82 (20% Fiber Tear) (80% Adhesive Bond) | 1.9 (100% Adhesive Bond) |
| Board 8 3% PVOH 355 fpm 90-26-90 | Pass | 115 (95% Fiber Tear) (5% Adhesive Bond) | 4.9 (10% Fiber Tear) (90% Adhesive Bond) |
| Board 9 3% PVOH 407 fpm 90-26-90 | Pass | 107 (95% Fiber Tear) (5% Adhesive Bond) | 5.8 (20% Fiber Tear) (80% Adhesive Bond) |
| Board 10 3% PVOH 450 fpm 90-26-90 | Pass | 105 (100% Fiber Tear) | 5.9 (15% Fiber Tear) (85% Adhesive Bond) |
| Board 11 3% PVOH 505 fpm 90-26-90 | Pass | 90 (60% Fiber Tear) (40% Adhesive Bond) | 4.1 (5% Fiber Tear) (95% Adhesive Bond) |

Board samples Nos. 5 and 7 were heated for one minute at 350° F. on the double backer side using a static pre-heater to see if there would be an additional increase in resin-PVOH-starch cross linking. It was felt that with the increased machine speed there might be insufficient time for the curing process to occur. However, neither pin adhesion nor ply separation results showed any significant change between regular production and the board with extra heat. Therefore, there was sufficient time and heat during regular production, and the bonding—cross linking of the polyvinyl alcohol, resin, and starch apparently went to completion.

Pin adhesion results were higher in those samples that had polyvinyl alcohol added when compared to the control sample. It is interesting to note that most of the board failure is fiber tear rather than adhesive bond thus indicating a superior bond with polyvinyl alcohol.

The water resistant ply separation test was successful for all samples including the control. That was expected because one of the properties of SUREBOND G-550 is to provide superior water resistant and water proof board when used with quality resins.

There were many mechanical problems with the corrugating machine during this series, but the operators did manage to run at a faster speed, particularly when the 3% polyvinyl alcohol adhesive was prepared. At one point they were able to run at 505 fpm which was significantly higher than their usual 200 fpm.

Although there is an improvement in the pin adhesion results when one uses either STABLEBOND G-551 or SUREBOND G-550. SUREBOND G-550 allowed for a greater flexibility of formulation by covering a wider range of solids concentrations to make the desired adhesive. For example, when polyvinyl alcohol is added to a starch adhesive there will be an increase in the viscosity; therefore, to keep the viscosity at a working level at the corrugator, one would have to decrease the amount of carrier starch or increase the volume of water used. Either step would lower the solids content and tend to adversely affect the board water resistance. However, one of the basic properties of SUREBOND G-550 is to provide a lower paste viscosity which means that more polyvinyl alcohol and starch solids can be added to the adhesive formulation while maintaining practical viscosities. Generally, the solids concentration was 1% higher in the SUREBOND G-550 series than in the STABLEBOND G-551 series.

The dry pin adhesion improved 30 to 40% with polyvinyl alcohol addition, and the bonding failure was caused by fiber tear rather than failure of the adhesive bond. Wet pin data showed a 20 to 30% improvement, but there was a reversal in board failure with most of it occurring at the bond rather than fiber tear. Ply separation differences, if any, were not observed in the SUREBOND G-550 polyvinyl alcohol series, but improved water resistance was observed in the STABLEBOND G-551 polyvinyl alcohol series.

Having set forth the general nature and some specific examples of the present invention, the scope of the invention is now more specifically set forth in the appended claims.

What is claimed is:

1. A corrugating adhesive composition which in an aqueous emulsion comprises water; about 0.04 to about 3 parts per 100 parts of adhesive of a cold water soluble polyvinyl alcohol which has been hydrolyzed in situ to a degree of hydrolysis of more than about 95%; about 2 to about 10 parts per 100 parts of the corrugating adhesive composition of a component selected from the group consisting of starch, modified starch and dextrin; sufficient caustic to provide an alkaline pH; about 10 to about 30 parts of starch per 100 parts of the corrugating adhesive composition; and about 0.3 to about 1 part of a boron containing compound per 100 parts of the corrugating adhesive composition.

2. The composition of claim 1 wherein the polyvinyl alcohol has a degree of hydrolysis of less than about 92% prior to hydrolysis in situ.

3. The composition of claim 1 wherein the polyvinyl alcohol has a degree of hydrolysis of less than about 88% prior to hydrolysis in situ.

4. The composition of claim 3 wherein the polyvinyl alcohol has a molecular weight of less than about 15,000 molecular weight units.

5. The composition of claim 4 further including a resin for waterproofing or water resistance in an amount from about 0.5 to about 5 parts resin per 100 parts of adhesive.

6. A carrier phase composition for use in a corrugating adhesive composition which in an aqueous emulsion comprises water; about 0.1 to about 10 parts per 100 parts of the carrier phase composition of a cold water soluble polyvinyl alcohol which has been hydrolyzed in situ to a degree of hyrdolysis of more than about 95%; about 5 to about 30 parts per 100 parts of the carrier phase composition of a component selected from the group consisting of starch, modified starch and dextrin; and sufficient caustic to provide an alkaline pH.

7. The composition of claim 6, further comprising from about 0.03 to about 1 part of a boron containing compound per 100 parts of the carrier phase composition.

8. The composition of claim 4 wherein the polyvinyl alcohol has a degree of hydrolysis of less than about 92% prior to hydrolysis in situ.

9. The composition of claim 7 wherein the polyvinyl alcohol has a degree of hydrolysis of less than about 88% prior to hydrolysis in situ.

10. The composition of claim 9 wherein the polyvinyl alcohol has a molecular weight of less than about 15,000 molecular weight units.

* * * * *